United States Patent
Sevar (10) Patent No.: US 10,704,934 B2
(45) Date of Patent: Jul. 7, 2020

(54) METHOD FOR CONVERTING A MEASUREMENT OF LOCAL VELOCITY OF A FLUID IN A CHANNEL OR A DUCT INTO A MEAN VELOCITY

(71) Applicant: FLOW-TRONIC S.A., Welkenraedt (BE)

(72) Inventor: Jean-Marie Sevar, Welkenraedt (BE)

(73) Assignee: FLOW-TRONIC S.A., Welkenraedt (BE)

(*) Notice: Subject to any disclaimer, the term of this patent is extended or adjusted under 35 U.S.C. 154(b) by 210 days.

(21) Appl. No.: 14/900,104

(22) PCT Filed: Jun. 19, 2014

(86) PCT No.: PCT/EP2014/062921
§ 371 (c)(1),
(2) Date: Dec. 18, 2015

(87) PCT Pub. No.: WO2014/202709
PCT Pub. Date: Dec. 24, 2014

(65) Prior Publication Data
US 2016/0138950 A1 May 19, 2016

Related U.S. Application Data

(60) Provisional application No. 61/837,994, filed on Jun. 21, 2013.

(51) Int. Cl.
*G01F 1/00* (2006.01)
*G01F 1/712* (2006.01)
*G01F 1/66* (2006.01)

(52) U.S. Cl.
CPC .............. *G01F 1/00* (2013.01); *G01F 1/002* (2013.01); *G01F 1/66* (2013.01); *G01F 1/663* (2013.01); *G01F 1/712* (2013.01)

(58) Field of Classification Search
CPC .................................. G01F 1/002; G01F 1/712
See application file for complete search history.

(56) References Cited

U.S. PATENT DOCUMENTS 5,315,880 A * 5/1994 Bailey ............... G01F 1/002
324/642
5,811,688 A 9/1998 Marsh et al.
(Continued)

FOREIGN PATENT DOCUMENTS

EP 0681683 B1 7/1996
FR 2826455 A1 12/2002

OTHER PUBLICATIONS

International Search Report for corresponding International Patent Application No. PCT/EP2014/062921 (dated Sep. 11, 2014).
(Continued)

*Primary Examiner* — Matthew G Marini
(74) *Attorney, Agent, or Firm* — Merchant & Gould P.C.

(57) ABSTRACT

A method calculates mean speed of a fluid flowing in an open channel or a partially filled duct. Fluid having a free surface of width L1 extending between walls of the channel or duct includes local speed measurements at the surface of the fluid over a zone of width L2, the set of local measurements generating a spectrum of discrete data expressed in a temporal domain. The spectrum of discrete data is converted into a spectrum of data expressed in a frequency domain via a Fourier transform. A Gaussian curve is fitted to the spectrum and the mean $\mu$ and the standard deviation $\sigma$ of the Gaussian curve are calculated. L2 and $\sigma$ enable calculating the distribution of speeds over L2. The ratio L2/L1 is calculated and the mean speed of the fluid within the channel or duct is determined based on the Gaussian curve and the ratio L2/L1.

23 Claims, 3 Drawing Sheets

(56) References Cited

U.S. PATENT DOCUMENTS

| | | | |
|---|---|---|---|
| 7,672,797 B2 | 3/2010 | Petroff | |
| 2012/0055239 A1* | 3/2012 | Sinha | G01N 29/024 |
| | | | 73/61.79 |
| 2012/0245863 A1* | 9/2012 | Rick | G01P 5/241 |
| | | | 702/50 |

OTHER PUBLICATIONS

"System Q-Eye Radar. Pulse-Doppler FFT TEchnology. Non Contact Open channel Flow Measurement System.", HydroVision Acoustic Flow Meter, Jun. 30, 2010 (Jun. 30, 2010), pp. 1-4, XP055136969, available Online at: http://www.globalagua.pt/cbx/q-eyeradar_e_a4.pdf.

Screen Shots Extracted from FlowTronicSA: "Raven-Eye for sewer monitoring", Jun. 20, 2013 (Jun. 20, 2013), XP054975498, availbale Online at: https://www.youtube.com/watch?v=iNtyAoYjk9w.

"Technical Specifications Raven-Eye, New Generation Open Channel Non-Contact Radar Velocity Sensor", Jun. 20, 2013 (Jun. 20, 2013), pp. 1-2, XP055137155, available Online at: http://www.flowtronic.com/en/downloads/technical-specifications/technical-specifications-raven-eye-en/view.

Stephane Fischer: "Development of an Ultrasonic Instrumentation for the Measurement of Liquid Velocities Beyond the Nyquist Limit by a Spectral Approach", Thesis, Feb. 14, 2006 (Feb. 14, 2006), pp. 1-213, XP055136903, available Online at: http://tel.archives-ouvertes.fr/docs/00/05/88/13/PDF/these_final.pdf.

Ceyda Polatel: "Large-Scale Roughness Effect on Free-Surface and Bulk Flow Characteristics in Open-Channel Flows", Phd Thesis, Jul. 31, 2006 (Jul. 31, 2006), pp. 1-234, XP055136944, available Online at: http://www.polatel.com/polatelDissertation.pdf.

* cited by examiner

METHOD FOR CONVERTING A MEASUREMENT OF LOCAL VELOCITY OF A FLUID IN A CHANNEL OR A DUCT INTO A MEAN VELOCITY

This application is a 371 National Stage Application of International Patent Application No. PCT/EP2014/062921, filed 19 Jun. 2014, which claims benefit of Ser. No. 61/837,994, filed 21 Jun. 2013 in the United States and which applications are incorporated herein by reference. To the extent appropriate, a claim of priority is made to each of the above disclosed applications.

SUBJECT-MATTER OF THE INVENTION

The present invention relates to a method making it possible to determine the mean velocity of a fluid in an open channel or a partially filled duct. More specifically, it relates to a method for determining the mean velocity of a fluid based on a local measurement of the surface velocity of the fluid.

It further relates to the device designed to carry out this method.

TECHNOLOGICAL BACKGROUND AND STATE OF THE ART

Within a duct traveled by a fluid, there is a velocity gradient both in the horizontal direction and the vertical direction of the wet straight section, the velocity being theoretically close to zero at the walls of the duct. It is therefore necessary to determine a mean velocity of the fluid. However, flowmeters generally take a occasional or partial measurement of velocities at the surface of the liquid or in the wet straight section. Thus, technologies based on velocity measurements such as measurements by propellers, turbines, force, Vortex, thermal measurements, measurements by transit-time ultrasounds, Doppler-effect ultrasounds, cross-correlation ultrasounds and, more particularly, surface velocity measurements in open channels by radar microwave, acoustic waves, optics and lasers all encounter the same problem of converting a precise local measurement of velocity into a correct mean velocity of the wet section, this mean velocity being next multiplied by the surface of the wet section to obtain the flow rate.

The most common manner for resolving this conversion problem is to calibrate the flowmeter on a calibration bench. This calibration technique is very often used for pressure ducts. For open channels, it is difficult or even impossible to reproduce all of the elements of the measuring site in a hydraulic laboratory or on a calibration bench. In order to refine the conversion of the local or even occasional velocity measurement in mean velocity measurement of the wet section, several calibration techniques are used. The most common is to read a matrix of velocity-measuring points by means of current meters, electromagnetic velocity probes, Doppler probe, laser probe or any other occasional velocity measuring device and convert that reading of velocity measurements into a mean velocity for the water level and the hydraulic conditions encountered during the reading. The calibration can also be done using reference flow rate measurements. These calibrations must be repeated for different water levels that may occur in the open channel or partially filled duct.

The hydraulic conditions are generally defined and characterized by the water level only, but other parameters (temperature, pH, conductivity, turbidity, etc.) can also be taken into consideration to define particular hydraulic flow conditions. In most cases, the level measurement is the element taken into account to characterize the hydraulic flow conditions. In some particular cases, when the level varies little, the occasional or local velocity measurement can be taken into account to characterize the hydraulic flow conditions. In more particular situations where there is a blockage of the flow downstream, a combination of the occasional or local velocity measurement and the level make it possible to determine the hydraulic conditions. Once the hydraulic conditions are defined by a measurement or set of measurements, a number of correction vectors corresponding to each hydraulic condition may be read by calibration on the measuring site, and converted into a conversion table (generally a conversion table depending on the level with linear interpolation between the different measuring points) or a correction model.

Apart from the difficulty to perform this reading precisely, this method has the tremendous drawback to require a lot of time to perform the readings under the different hydraulic flow conditions. It will also be noted that it is sometimes impossible to perform these readings for technical or operator's safety reasons.

In order to avoid these drawbacks, new technologies have been patented or applied.

U.S. Pat. No. 7,672,797 B2 describes a method consisting in determining the maximum velocity on a vertical velocity profile and in applying a multiplier factor on this maximum velocity to compute the mean velocity.

U.S. Pat. No. 5,811,688 describes a method based on a local velocity measurement at the surface of the fluid consisting in applying multiplier factors on the measured surface velocity, the multiplier factors depending on the level of fluid in the duct.

Other technologies based on mathematical models can also be used. One of the best known is the finite element model by Dr. Kölling, as described in patent EP 0 681 683 B1. It simulates a set of flow-velocity distributions in a channel having a known profile, for several liquid levels in the channel. Based on a measurement of the liquid level and a velocity measurement, it next selects the simulated velocity distribution that is appropriate for the measured liquid level.

The main drawback of mathematical models is that they must be supplied with data characterizing the channel or the duct. This data includes the slope and roughness, which are difficult to determine precisely; the roughness may also evolve over time.

AIMS OF THE INVENTION

The present invention aims to do away with the drawbacks of the state of the art.

More specifically, the present invention aims to determine, by measurement, the mean velocity of the fluid in the wet section without resorting to simulation models or correction factors requiring tedious calibrations.

MAIN FEATURES OF THE INVENTION

The present invention relates to a method for calculating the mean velocity of a fluid flowing in an open channel or a partially filled duct, said fluid having a free surface of width L1 extending between the walls of the channel or duct, said method comprising the following steps:

local velocity measurements at the surface of the fluid over a zone of width L2, the set of local measurements generating a signal in the form of a spectrum of discrete data expressed in a temporal domain;

conversion of the spectrum of discrete data expressed in the temporal domain into a spectrum of data expressed in a frequency domain via a Fourier transform;

fitting of a Gaussian curve to the spectrum of discrete data expressed in the frequency domain and calculation of the parameters of the Gaussian curve, namely the mean $\mu$ and the standard deviation $\sigma$ of the Gaussian curve; the frequency at the mean $\mu$ making it possible to calculate the mean surface velocity over the zone of width L2 and the standard deviation $\sigma$ making it possible to calculate the velocity distribution over this same zone of width L2;

calculation of the ratio L2/L1 between the width L2 of the zone impacted during the measurements and the width L1 of the free surface of the fluid;

determination of the mean velocity of the fluid within the open channel or partially filled duct on the basis of the parameters of the Gaussian curve and as a function of the ratio L2/L1.

According to specific embodiments of the invention, the method includes at least one or a suitable combination of the following features:

several sequences of local velocity measurements are done, said sequences being summed after the Fourier transform resulting in a single sequence to which the Gaussian curve is fitted;

the step for fitting a Gaussian curve is done on a group of discrete data that is the most energetic in a predetermined velocity range;

said most energetic group of discrete data is selected as follows: the most energetic peak in the predetermined velocity range is sought, a given fraction of the energy of the peak is calculated, the contiguous groups of measurements whose energy exceeds that calculated value are sought, the surfaces represented by each group are calculated, the group having the largest surface is selected, and a Gaussian function representing an identical surface is calculated and superimposed on said selected group;

the given fraction is comprised between ⅓ and ½;

when L1 is equal to L2, the mean velocity of the fluid within the open channel or partially filled duct is equal to the mean surface velocity of the fluid over the zone of width L2;

when the ratio L2/L1 is greater than or equal to ⅗ or, preferably greater than or equal to ⅔, and less than 1, the mean velocity of the fluid within the open channel or the partially filled duct is equal to the mean surface velocity of the fluid over the zone of width L2 multiplied by a correction factor that depends on the standard deviation $\sigma$ of the Gaussian curve;

the correction factor is greater than 0.9, and more specifically comprised between 0.94 and 0.98;

the ratio L2/L1 is less than ⅗, or preferably than ⅔, the mean velocity of the fluid within the open channel or the partially filled duct is calculated based on the velocity distribution measured over the zone of width L2 extrapolated for the missing velocities based on prior recordings of the velocity distribution when said ratio was greater than or equal to ⅗, or preferably greater than or equal to ⅔;

it comprises a prior step for validating measurements as a function of predefined parameters before the step for determining the mean velocity within the open channel or the partially filled duct;

the predefined parameters are a value in dB of the gain of an automatic amplifier, the number of data located below the envelope of the Gaussian curve and/or the maximum amplitude of the Gaussian curve relative to the amplitude of all of the measurements including the background noise;

when the value in dB of the gain is above a given value, there is a step for focusing on the lowest velocities of the spectrum and then again a step for fitting a Gaussian curve to the spectrum of discrete data selected after focusing on the lowest velocities and a step for calculating the parameters of the Gaussian curve;

the given value is 80 dB for a measurement range comprised between −0.6 m/s and +0.6 m/s;

the given value is 84 dB for a measurement range comprised between −0.3 m/s and +0.3 m/s;

the predefined parameters can be adapted by a user by filling in a questionnaire;

the Fourier transform is a fast Fourier transform.

The present invention also relates to a device for calculating the mean velocity of a fluid flowing in an open channel or a partially filled duct, said fluid having a free surface of width L1 extending between the walls of the channel or duct, said device comprising:

a sensor for performing velocity measurements at the surface of the fluid over a zone of width L2 smaller than or equal to the width L1; said sensor providing a signal in the form of a spectrum of discrete data expressed in a temporal domain;

a processor to convert the spectrum of discrete data expressed in the temporal domain into a spectrum of data expressed in a frequency domain via a Fourier transform, to calculate a Gaussian curve fitted to the spectrum of data expressed in the frequency domain, to calculate the ratio L2/L1, and to determine the mean velocity within the open channel or partially filled duct based on the Gaussian curve and the ratio L2/L1.

According to specific embodiments of the invention, the device comprises at least one or a suitable combination of the following features:

it further comprises storage means for forming a databank used later to calculate the mean velocity of the fluid within the open channel or partially filled duct when the velocity distribution over the width L2 is not representative of the velocity distribution over the width L1;

it comprises a user interface that allows on-site modification of the conditions for validating measurements done by the sensor;

it further comprises a level sensor for the fluid in the channel or duct in order to calculate the width L1.

The present invention also relates to a computer program comprising a software code suitable for implementing the method described above and by recording data readable by a computer comprising said program.

LEGEND (1) Duct or channel
(2) Sensor
L1: width of the free surface of the fluid in the duct or channel
L2: width of the surface of the fluid impacted by the energy source

GENERAL DESCRIPTION OF THE INVENTION

The method according to the invention is based on surface or sub-surface velocity measurements done using any technology capable of performing such a measurement. Preferably, the measurements are done using nonintrusive probes or transducers, i.e., without contact with the liquid to be measured, such as optical, laser, acoustic or radar (microwave) measurements.

Figure 1:
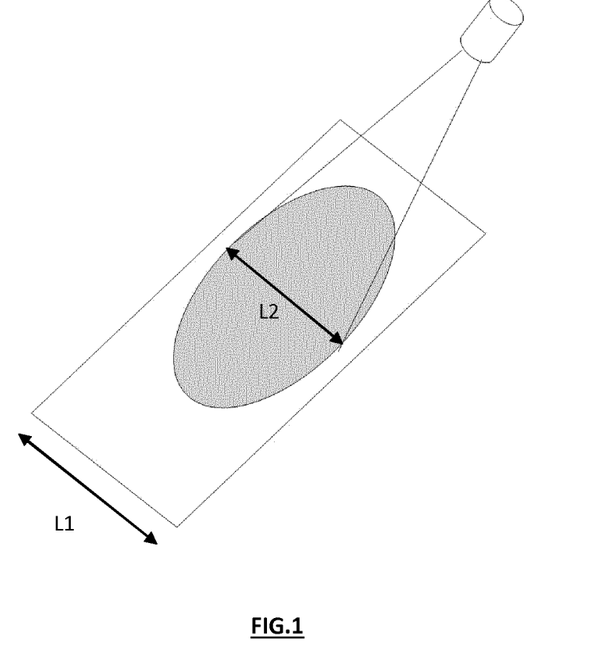
FIG. 1 diagrammatically shows the zone of the surface of the liquid impacted by the energy source during the velocity measurement. L1 corresponds to the width of the free surface of the fluid flowing in the open channel or partially filled duct and L2 corresponds to the width of the zone impacted by the energy source. The width is defined as a dimension with a direction perpendicular to the flow direction of the fluid.

These nonintrusive velocity measurement technologies make it possible, through the appropriate use of horn antennas for microwave radars, of optical lenses for optical systems and laser or of soundwave guides for acoustic systems, to focus the energy of the emitted signal precisely. This has the advantage that the dimensions of the impacted zone (see gray zone in FIG. 1) and, in particular the width L2 of the impacted zone, can be calculated precisely and compared to the width L1 of the free surfaces of the liquid in the channel or duct.

For microwave radar systems, a precise number of pulses is sent from top to bottom with a known elevation angle toward the surface of the liquid to be measured. The signals reflected by the surface of the liquid in motion have a frequency shift due to the Doppler effect that is directly proportional to the movement velocity of the particles of the surface of the liquid generating the reflected signals. Each reflected pulse will generate a measurement datum. The number of reflected pulses in a sequence of measurements will generate a complex mosaic of discrete data. These sequences are regularly repeated during the sampling periods. This constitutes a set of discrete data expressed in amplitude as a function of time.

According to the invention, the spectrum of data of each sequence expressed in the temporal domain is transformed into a frequency domain via a discrete Fourier transform (DFT), and preferably, a fast Fourier transform (FFT) in order to reduce the calculation time. The digital processing of the spectrum of discrete data of the temporal domain by FFT in the frequency domain thus makes it possible to perform the necessary filtering operations to bring out the different velocity measurements (velocity spectrum) that are sought.

Figure 2:
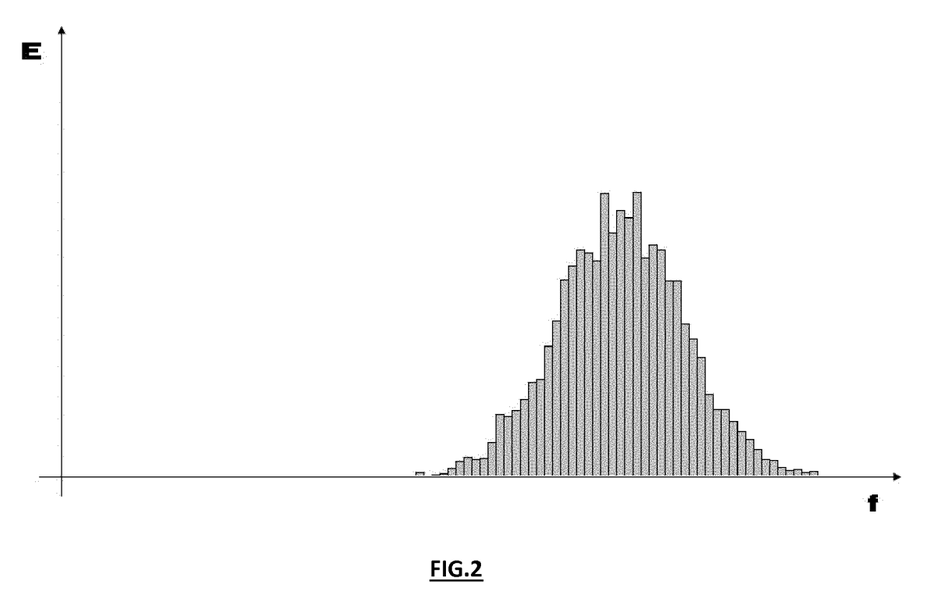
FIG. 2 shows the spectrum of discrete data obtained after measurement and expressed in amplitude of the signal (energy) as a function of the frequency after a fast Fourier transform.

A standard graph of a sequence of measurements after fast Fourier transform (FFT) is shown in FIG. 2.

Figure 3:
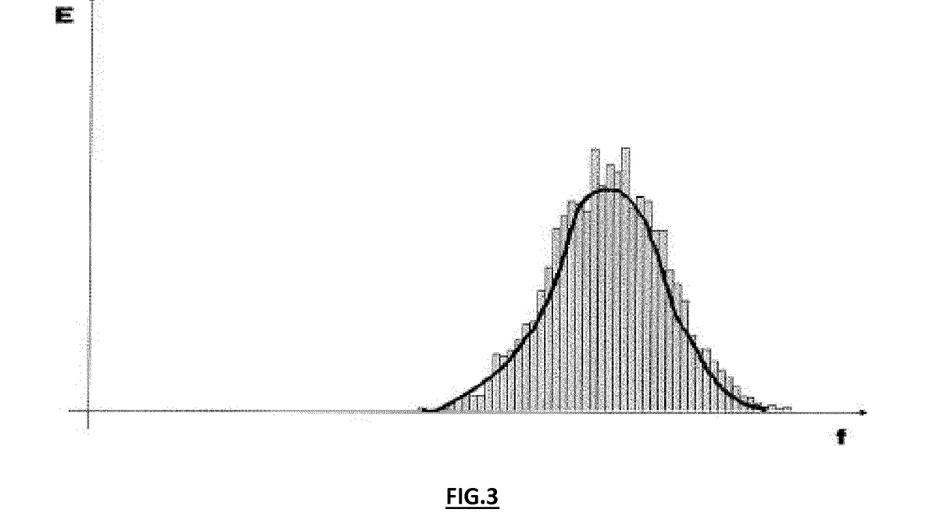
FIG. 3 shows the Gaussian curve fitted to the spectrum of FIG. 2.

One essential feature of the method according to the invention consists in performing a complementary mathematical transformation to the spectrum of transformed data rather than using the raw data from the fast Fourier transform (FFT). The tests done by the applicant have shown that the energy distribution graphs always have the characteristic bell shape specific to the Gaussian function. The complementary mathematical transformation therefore consists in fitting a Gaussian function to the energy distribution of each sequence of discrete data (best-fitted Gaussian), as shown in FIG. 3.

If the measurements done are considered to be valid for the reasons explained later, the Doppler frequency at the maximum amplitude, i.e., the mean $\mu$ of the Gaussian curve, makes it possible to calculate, via known relationships, the mean surface velocity for the impacted zone, and the standard deviation $\sigma$ of the Gaussian curve makes it possible to determine the expanse of the velocity spectrum for that same impacted zone.

The processor next calculates whether the entire width L1 of the surface of the fluid is illuminated by the energy source of the sensor or if only one part of it is, and in that case, determines the illuminated proportion. If all or even a large portion of the free surface is illuminated, i.e., if more than 3/5 and, preferably, more than 2/3 of the zone of width L1 is illuminated, it can be concluded that the standard deviation is not only representative of the horizontal velocity distribution of the wet section, but also of the vertical velocity distribution in that same wet section. Indeed, it is known from the prior art (see FIG. 2 of patent EP 0 681 683 B1 by Kölling) that the vertical velocity distribution is an image of the horizontal velocity distribution for completely developed velocity profiles, i.e., in the absence of disruptions upstream and downstream of the measurement zone. The mean velocity calculated at the surface based on the Gaussian can therefore be considered equal or substantially equal to the mean velocity of the fluid within the wet section.

If the width L2 of the illuminated zone has a size smaller than 3/5, or preferably 2/3, of the width L1 of the free surface of the liquid, it is then necessary to use prior measurement recordings of the standard deviation where a wider zone was illuminated in order to perform extrapolations for the missing velocities in the non-impacted zones.

The mean velocity can be calculated based on the Gaussian curve only after the measurements are validated. Validation is intended to eliminate measurements that may not be correct.

Two scenarios are considered, which will be explained more fully in the detailed description of the invention.

In a first scenario, the energy of the received signal is high relative to the background noise, i.e., the value in dB of the automatic gain control of the amplifier is below a predetermined value. In this case, the processor verifies that the number of discrete velocity measurements that fall within the Gaussian curve and/or that the amplitude of the Gaussian curve relative to all of the measurements within the entire spectrum including the background noise are within a range of values that were determined beforehand upon set-up of the transducer. If so, the measurements are validated. Otherwise, they are rejected.

In a second scenario, the energy of the received signal is low relative to the background noise, i.e., the value in dB of the automatic gain control is above one (or several) predetermined value(s). This may for example be the case when the flow within the duct is slow. In this scenario, the processor could select parasitic velocities that are higher, because they are more energetic, and therefore provide an erroneous velocity value. To resolve this problem, a step for focusing on the lowest frequencies of the spectrum, i.e., on the lowest velocities, is provided, as explained in more detail below.

DETAILED DESCRIPTION OF THE INVENTION

The method according to the invention uses the following data:
- the discrete data resulting from the measurements by the sensor, from which calculations of the fast Fourier transform (FFT) and the Gaussian function (best-fit Gaussian) are done to be superimposed on the spectrum expressed in the frequency domain, this transformation making it possible to obtain a much more stable measurement over time;
- the data from the Gaussian curve, i.e., the mean μ and the standard deviation a, which will make it possible to calculate the mean velocity of the fluid and the expanse of the velocity spectrum;
- the energy at the maximum amplitude of the Gaussian curve and the mean energy of the transformed signal, i.e., the set of all of the tranformed measurements, including the background noise, in order to determine the signal-to-noise ratio (SNR);
- the value of the gain of the automatic amplifiers;
- the number of velocity measurements found below the envelope of the Gaussian curve or VSN (Velocity Spectrum Number);
- the exact dimensions of the illuminated zone. By knowing the opening angle of the beam, the elevation angle and the distance of the sensor relative to the target surface, it is possible to obtain a precise calculation of the width L2 of the part illuminated by the microwave beam. This information will be used to determine the percentage of the width L1 of the free surface of the illuminated liquid, i.e., the ratio between the width L2 of the illuminated part and the width L1 of the free surface of the fluid;
- the dimensions and the shape of the channel or duct as well as the level of the liquid in the channel or duct to calculate the distance of the sensor relative to the liquid, which makes it possible to calculate the width L1 of the free surface mentioned above.

In a first step, the sensor takes a series of local measurements at the surface of the fluid, and a set of discrete data expressed in amplitude as a function of time is obtained. For example, 32 sequences of 1024 pulses are sent toward the surface of the liquid during a sampling period.

In a second step, the processor performs the fast Fourier transform (FFT) on the discrete data from the first step, for each sequence of discrete data, i.e., 32 FFT.

In a third step, the different sequences of discrete data are summed in order to obtain a single sequence of discrete data with high amplitudes. This makes it possible to bring out the measurement signals relative to the background noise. Indeed, the background noise is made up of random signals that are reduced during additions, while the sequences of measurements are repetitive, i.e., similar or even identical in frequency, and will therefore increase during additions.

In a fourth step, the Gaussian curve is fitted to the sequence of discrete data obtained after the aforementioned addition, and the following parameters are calculated: the frequency for the mean μ of the Gaussian curve and the standard deviation σ of the Gaussian curve. The fitting of the Gaussian function to the frequency distribution makes it possible to obtain remarkable results both in terms of absolute precision of the measurement and temporal stability of the surface velocity. Another advantage of the use of the Gaussian function is obtaining the value of the standard deviation a, which provides a direct measurement of the expanse of the spectrum of measured velocities. Preferably, the Gaussian curve is fitted to the most energetic group of discrete data in the measurement range defined during commissioning or by the user on site. Thus, if a measurement range between −1 m/s and +6 m/s has been defined, the processor seeks the most energetic peak in that range. Then, the processor calculates a given fraction of the maximum energy, for example ⅓ or ½, and looks for the contiguous groups of measurements whose energy exceeds that calculated value. It next calculates the surfaces represented by each group. The group having the largest surface is selected, and a Gaussian function representing an identical surface is calculated and superimposed on the selected group of measurements. In the fifth step, it will be seen that it is possible to look on site for this group of measurements in a more restricted velocity range at a lower velocity if, for example, the received signal is weak.

In a fifth step, the process for validating the measurements is undertaken and consists in comparing certain parameters to predefined values. If the value in dB of the automatic gain control (AGC) is below a predetermined value, which means that the energy of the received signal is high relative to the background noise, and/or if the option of focusing on slow flows has not been checked in the user interface, the processor may directly go to the step for analyzing the quality of the measurements done by verifying that the quality parameters of the Gaussian curve are within the predefined limits. The parameters to be compared to limit values are the number of measurements under the envelope of the Gaussian curve (VSN, Velocity Spectrum Number) and/or the amplitude of the Gaussian curve representing the energy of the received signal relative to the mean energy of the transformed signal, i.e., all of the transformed measurements (SNR, Signal to Noise Ratio). The limit values are values transferred to the transducer upon set-up. They are set by default and cover approximately 70% of applications. As will be explained later, the limit values can be adapted at any time based on hydraulic conditions (roughness, slope of the walls, blockage downstream, etc.) so as to take particular conditions of a measurement site into account. To that end, a simple questionnaire has been developed so as to facilitate the task of a user with less experience or with little or no knowledge of hydraulics. Modifying the default values of the quality parameters makes it possible to cover 90% to 95% of applications instead of +/−70% with the default parameters, without having to understand the abstract values of the quality parameters in order to modify them correctly.

Examples of simple questions asked to the user are:
  Is the slope:
    gentle<=0.2%
    normal 0.2%<P<=0.5%
    steep>0.5%
  Is the roughness of the duct:
    mild (PVC, PE, asbestos cement, etc.)
    normal (concrete duct, etc.)
    high (brick channel, etc.)
  Stagnant water possible:
    yes
    no Rapid variation of the flow due to the presence of lift pumps upstream nearby:
yes
no
Focusing on slow flows:
yes
no
Downstream hydraulic influence (blockage, tide influence, etc.):
yes
no Depending on the user's answers, the limit values of the quality parameters will be adapted automatically.

If the quality parameters are within the limits thus predetermined or modified at a later time following the answers to the questionnaire, the measurement is validated and accepted. If the quality parameters are outside the limits thus predetermined, the measurement is rejected and the last good measurement is kept. This maintenance is done a predetermined number of times (NOH, Number Of Holds) before switching the measurement to zero or another predetermined value during commissioning, or to a value obtained based on a level/velocity table on a theoretical basis, or even better based on prior measurements on the same measurement site if one of the stagnant water possible or downstream hydraulic influence options has not been checked in the questionnaire during commissioning. The table can be filled in automatically by the processor over the course of validated velocities measured at different levels or manually during commissioning.

If the value in dB of the automatic gain control (AGC) is above one or several predetermined value(s), which means that the energy of the received signal is low relative to the background noise, and focus on slow flows has been checked during commissioning or in the user interface, the processor will repeat its analysis of the received signals while focusing its search in a low-velocity measurement range, i.e., low frequencies of the spectrum. For example, it can focus its search in a measurement range of +/−0.6 m/s or even +/−0.3 m/s as a function of the energy level of the signal, the focus limit values being able to be modified upon commissioning, as well as the limit value(s) of the gain expressed in dB, if necessary.

The causes of a low signal/background noise ratio are, in the case of a measurement by microwave radar, almost exclusively related to the low flow velocities and associated smooth surfaces. The processor will tend to select higher parasitic velocities because they are more energizing. For other acoustic, optical or laser measurement techniques, the distance from the transducer to the surface to be measured can have a strong influence on the signal/background noise ratio. These high-amplitude parasitic signals can represent a single frequency or a frequency spectrum resembling a velocity spectrum. The single-frequency parasite will be eliminated because it will be outside the limit values of the quality parameters, but it will conceal the actual low amplitude value. The frequency spectrum will represent a plausible, but incorrect velocity measurement. This is why, according to the invention, it is possible to focus on the low velocities. This focusing on the low velocities will be done when the automatic gain control exceeds a predetermined value, for example, 80 dB for a measurement range, for example, from +/−0.6 m/s, or even for example, 84 dB for a measurement range of, for example, +/−0.3 m/s. These limit values can be modified upon commissioning if necessary. After focusing on the low velocities, the processor will proceed as mentioned above in steps 4 and 5.

In a sixth step, the processor calculates whether the entire surface is illuminated by the emitted signal or if only one part of the surface is illuminated, and in the latter case, determines the proportion and, on that basis, calculates the mean velocity in the wet section.

It has been shown that the velocity distribution at the free surface of the liquid is representative of the vertical velocity distribution in the wet section. The mean velocity within the wet section can therefore be deduced from the mean velocity at the surface of the liquid. However, the impacted zone may not have a sufficient size to be representative of the entire velocity distribution at the free surface of the liquid. Thus, depending on the size of the impacted zone, the mean velocity within the duct may be deduced directly from the mean velocity measured at the surface or indirectly via corrections or extrapolations.

Figure 5:
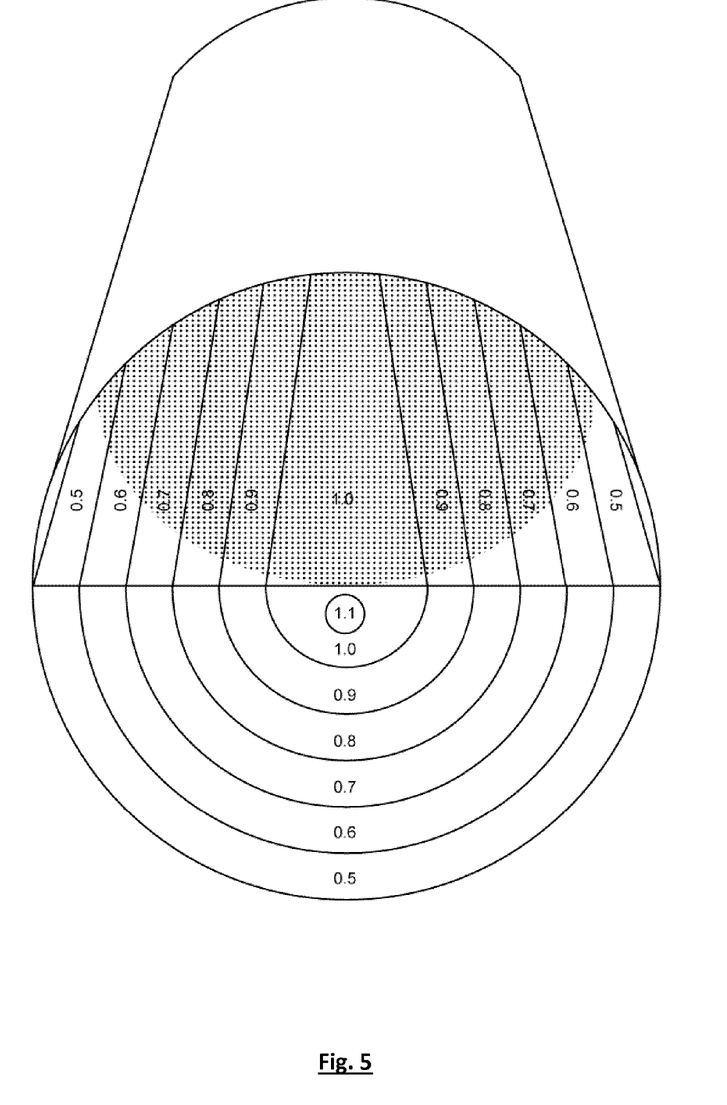
FIG. 5 diagrammatically shows a liquid flow in a partially filled circular duct with the different velocity lines as they are encountered in the straight section with their repercussion at the surface of the liquid, and the measurement zone illuminated by the microwaves.

When L1 is equal to L2, as explained above, the mean velocity of the fluid over the impacted zone, i.e., the velocity at the mean $\mu$ of the Gaussian curve, is equal to the mean velocity within the wet section. It will, however, be noted that in certain cases, when the flow is not turbulent as diagrammed in FIG. 5, there may be a higher-velocity zone (1.1 in the illustrated example) below the surface where the velocity line does not emerge on the surface. Optionally, and in this particular case, a slight correction of 1 to 2% can be made to the measured surface velocity to take this phenomenon into account.

When L2 is less than L1 but comprised between $3/5$ or, preferably, $2/3$ and $3/3$ of L1, i.e., $3/5$ or $2/3 \leq L2/L1 < 1$, the slower velocity zones close to walls of the duct may not have been impacted and a correction may thus prove necessary. This correction depends on the standard deviation of the Gaussian, and is even more important when the ratio L2/L1, and thus the standard deviation, is lower. In practice and for information, the correction to be made to the measured mean velocity is less than 10%, and more specifically less than 6%. Still more specifically, it is comprised between 2 and 6%, or between 2 and 4%.

Figure 4:
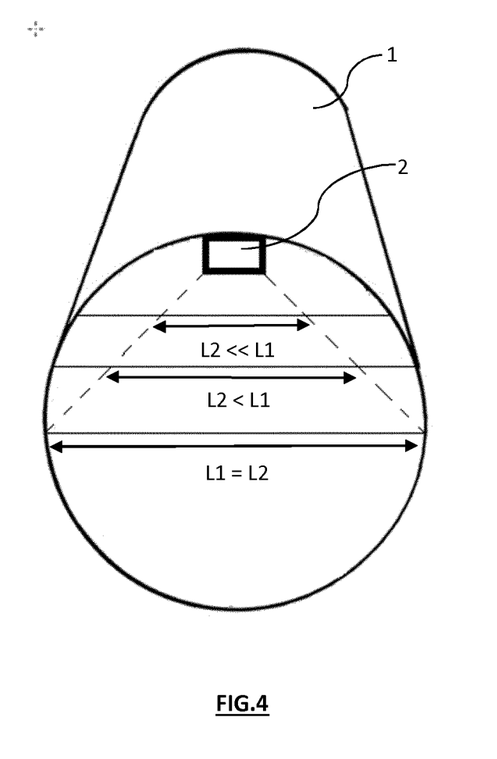
FIG. 4 illustrates the effect of the water level in the duct on the size of the zone impacted by the energy source of the sensor.

In some cases, only one portion of the surface is illuminated. This is for example the case for circular, rectangular, ovoid or other ducts where a part of the measurements are lost when the filling is, for example, between 50 and 100%, as shown in FIG. 4. This is also the case if the distance between the measuring probe and the surface of the liquid decreases. Given the geometry of the facility, only one part of the surface will be illuminated. In these scenarios, the standard deviation data previously recorded for different values of $\mu$ during measurements for lower filling are used as projection (extrapolation) for higher filling. It is then possible to calculate the mean velocity based on the distribution of measured velocities and extrapolated data completing the missing velocities in the spectrum. The correction made therefore depends on the standard deviations recorded beforehand for lower filling rather than on the standard deviation resulting from the Gaussian curve of the measurements in progress. Practically, and for information, the correction is less than 10%, and more generally less than 8%. More specifically, it may be comprised between 3 and 8%, or even between 4 and 6%. The correction is also even greater when the ratio L2/L1 is lower. It will be noted that in extreme cases where almost the entire duct is filled, the correction may be positive, i.e., the corrected velocity is greater than the measured mean velocity.

To conclude, it will be specified that in step 6, the calculation of the illuminated percentage could already be done before one of steps 3-5.

Furthermore, the method has been more particularly described for a microwave radar system, but applies to any measurement system generating a spectrum of discrete measurements.

The present method has been described with a step 3 for summing different sequences, and then a step for fitting to the resulting sequence. Alternatively, step 3 can be omitted and a step for fitting a Gaussian curve may be done on each sequence, a mean of the parameters $\mu$ and $\sigma$ being next calculated and serving as a basis for the calculation of the mean velocity of the wet section.

ADVANTAGES OF THE INVENTION

The method according to the invention does away with complex modeling or tedious calibrations. It is based on its databank acquired during the previous measurements, where the level was lower and where the width of the illuminated surface was equal to a value situated between ⅔ and the entire 1/1 of the width of the free surface. Under these conditions, the standard deviation represents the complete expanse of the velocity distribution at the surface, which, for a fully developed velocity profile, is very similar to the velocity distribution in the vertical section. These recorded values, which constitute the databank, represent the real hydraulic flow conditions in the duct, i.e., on the measurement site, and will be used to calculate the mean velocity with much greater ease and precision from the measurement of the surface velocity when the level will be higher and the width of the illuminated part will become smaller. Since the processor detects the conditions under which the data can be recorded, it may be referred to as "self-learning".

The method according to the invention further makes it possible to optimize the analysis of the data for slow-flow conditions and to achieve low-velocity detection thresholds with higher precision, as well as an automatic adaptation of the limit values of the quality parameters by answering simple questions describing the measurement site and the hydraulic conditions.

The invention claimed is:

1. A method for determining with a processor with reduced calibrations a mean velocity of a fluid flowing in an open channel or a partially filled duct, said fluid having a free surface of width L1 extending between the walls of the channel or duct, said method comprising the following steps:
performing local velocity measurements at the surface of the fluid over a zone of width L2, by generating a predetermined number of pulses and directing the pulses at a known angle toward the zone of width L2 to reflect the pulses by the surface of the flowing fluid; the set of local measurements generating a signal in the form of a spectrum of discrete data expressed in a temporal domain, the signals having a frequency shift proportional to velocity of particles at the surface of the fluid;
converting the spectrum of discrete data expressed in the temporal domain into a spectrum of data expressed in a frequency domain via a Fourier transform;
fitting of a Gaussian curve to the spectrum of discrete data expressed in the frequency domain and calculating the mean $\mu$ and the standard deviation $\sigma$ of the Gaussian curve; the frequency of the mean $\mu$ enabling calculating mean surface velocity over the zone of width L2 and the standard deviation $\sigma$ enabling calculating velocity distribution over the same zone of width L2;
calculating a ratio L2/L1 between the width L2 of the zone impacted during the measurements and the width L1 of the free surface of the fluid to determine whether one of three cases is met;
the processor being self-learning by detecting conditions under which the spectrum of discrete data obtained is recordable, and determining the mean velocity of the fluid within the open channel or the partially filled duct free of finite element or finite difference modeling, the mean velocity based on the ratio L2/L1 along with the mean $\mu$ and the standard deviation $\sigma$ of the Gaussian curve, the processor calculating the mean velocity with increased efficiency and precision using fewer calculations from the measurement of the surface velocity using the reduced pulsed zone of width L2;
wherein, in a first case, L1 is equal to L2, the mean velocity of the fluid within the open channel or partially filled duct is equal to the mean surface velocity of the fluid over the zone of width L2;
wherein, in a second case, the ratio L2/L1 is greater than or equal to ⅔ and less than 1, the mean velocity of the fluid within the open channel or partially filled duct is equal to the mean surface velocity of the fluid over the zone of width L2 multiplied by a correction factor that depends on the standard deviation $\sigma$ of the Gaussian curve; and
wherein, in a third case, the ratio L2/L1 is less than ⅔, the mean velocity of the fluid within the open channel or partially filled duct is calculated based on the distribution of velocities measured over the zone of width L2 extrapolated for the missing velocities based on prior recordings of the velocity distribution when said ratio was greater than or equal to ⅔.

2. The method according to claim 1, wherein a plurality of sequences of local velocity measurements are done, said sequences being summed after the Fourier transform, resulting in a single sequence to which the Gaussian curve is fitted.

3. The method according to claim 1, wherein the step for fitting a Gaussian curve is done on a group of discrete data that is a most energetic group of discrete data in a predetermined velocity range.

4. The method according to claim 3, wherein selecting said most energetic group of discrete data comprises:
seeking the most energetic peak in the predetermined velocity range;
calculating a given fraction of the energy of the most energetic peak;
seeking contiguous groups of measurements whose energy exceeds the calculated given fraction;
calculating the surfaces represented by each group;
selecting the group having the largest surface; and
calculating a Gaussian function representing an identical surface superimposing the calculated Gaussian function on said selected group.

5. The method according to claim 4, wherein the given fraction is comprised between ⅓ and ½.

6. The method according to claim 5, wherein the correction factor is between 0.94 and 0.98.

7. The method according to claim 1, comprising a prior step for validating measurements as a function of predefined parameters before the step for determining the mean velocity of the fluid within the open channel or partially filled duct.

8. The method according to claim 7, wherein the predefined parameters are a value in dB of the gain of an automatic amplifier, the number of measurements located below the envelope of the Gaussian curve and/or the maximum amplitude of the Gaussian curve relative to the amplitude of all of the measurements including the background noise.

9. The method according to claim 8, wherein, when the value in dB of the gain is above a given value, the method further comprises: a step for focusing on the lowest velocities of the spectrum and then again a step for fitting a Gaussian curve to the spectrum of discrete data selected after focusing on the lowest velocities and a step for calculating the mean $\mu$ and the standard deviation $\sigma$ of the Gaussian curve.

10. The method according to claim 9, wherein the given value is 80 dB for measurement range comprised between −0.6 m/s and +0.6 m/s.

11. The method according to claim 9, wherein the given value is 84 dB for a measurement range comprised between −0.3 m/s and +0.3 m/s.

12. The method according to claim 7, further comprising adapting the predefined parameters by a user by filling in a questionnaire.

13. The method according to claim 1, wherein the Fourier transform is a fast Fourier transform.

14. A computer program comprising a non-transitory computer-readable medium suitable for implementing the method according to claim 1.

15. Means for recording data readable by a computer comprising the program according to claim 14.

16. The method according to claim 1, wherein, when the ratio L2/L1 is less than ⅔, the mean velocity of the fluid within the open channel or partially filled duct is calculated based on the distribution of velocities measured over the zone of width L2 extrapolated for the missing velocities based on prior recordings of the velocity distribution when said ratio was greater than or equal to ⅔.

17. The method according to claim 1, wherein the pulses comprise microwave radar pulses.

18. A device for determining with a processor a mean velocity of a fluid flowing in an open channel or a partially filled duct, said fluid having a free surface of width L1 extending between the walls of the channel or duct, said device comprising:
  an energy source directed at a zone of width L2 covering at least a portion of the surface of the flowing fluid, the energy source generating pulses;
  a sensor for performing velocity measurements based on the pulses being reflected at the surface of the fluid over the zone of width L2 smaller than or equal to the width L1; said sensor providing a signal in the form of a spectrum of discrete data expressed in a temporal domain, the signal having a frequency shift proportional to velocity of particles at the surface of the flowing fluid;
  a processor to:
    convert the spectrum of discrete data expressed in the temporal domain into a spectrum of data expressed in a frequency domain via a Fourier transform, the process being configured to fit a Gaussian curve to the spectrum of discrete data expressed in the frequency domain, and to calculate the mean $\mu$ and the standard deviation $\sigma$ of the Gaussian curve; the frequency of the mean $\mu$ enabling calculating mean surface velocity over the zone of width L2 and the standard deviation $\sigma$ enabling calculating velocity distribution over the same zone of width L2;
    calculate the ratio L2/L1 between the width L2 of the zone impacted during the measurements and the width L1 of the free surface of the fluid to determine whether one of three cases is met;
  the processor being self-learning by detecting conditions under which the spectrum of discrete data obtained is recordable, and determining the mean velocity of the fluid within the open channel or the partially filled duct free of finite element or finite difference modeling, the mean velocity based on the ratio L2/L1 along with the mean $\mu$ and the standard deviation $\sigma$ of the Gaussian curve, the processor calculating the mean velocity with increased efficiency and precision using fewer calculations from the measurement of the surface velocity using the reduced pulsed zone of width L2;
  wherein, in a first case, L1 is equal to L2, the mean velocity of the fluid within the open channel or partially filled duct is equal to the mean surface velocity of the fluid over the zone of width L2;
  wherein, in a second case, the ratio L2/L1 is greater than or equal to ⅔ and less than 1, the mean velocity of the fluid within the open channel or partially filled duct is equal to the mean surface velocity of the fluid over the zone of width L2 multiplied by a correction factor that depends on the standard deviation $\sigma$ of the Gaussian curve; and
  wherein, in a third case, the ratio L2/L1 is less than ⅔, the mean velocity of the fluid within the open channel or partially filled duct is calculated based on the distribution of velocities measured over the zone of width L2 extrapolated for the missing velocities based on prior recordings of the velocity distribution when said ratio was greater than or equal to ⅔; and
  storage for forming a databank from the velocity measurements used to determine the mean velocity of the fluid within the open channel or partially filled duct when the velocity distribution over the width L2 is not representative of the velocity distribution over the width L1;
  the processor's calculation of the mean velocity having increased efficiency and precision through performance of fewer calculations from the measurement of the surface velocity using the reduced pulsed zone of width L2.

19. The device according to claim 18, comprising a user interface that allows on-site modification of the conditions for validating measurements done by the sensor.

20. The device according to claim 18, further comprising a level sensor for the fluid in the channel or duct in order to calculate the width L1.

21. The device according to claim 18, wherein the energy source comprises a microwave radar system.

22. The device according to claim 18, wherein the energy source comprises a microwave radar system generating a predetermined number of the pulses and directing the pulses at a known angle toward the zone of width L2 to reflect the pulses by the surface of the flowing fluid.

23. A method for determining with a processor free of finite element or finite difference modeling and with reduced calibrations a mean velocity of a fluid flowing in an open channel or a partially filled duct, said fluid having a free surface of width L1 extending between the walls of the channel or duct, said method comprising the following steps:
  performing local velocity measurements at the surface of the fluid over a zone of width L2, by generating a predetermined number of pulses and directing the pulses at a known angle toward the zone of width L2 to reflect the pulses by the surface of the flowing fluid; the set of local measurements generating a signal in the form of a spectrum of discrete data expressed in a temporal domain, the signals having a frequency shift proportional to velocity of particles at the surface of the fluid;

converting the spectrum of discrete data expressed in the temporal domain into a spectrum of data expressed in a frequency domain via a Fourier transform;

fitting of a Gaussian curve to the spectrum of discrete data expressed in the frequency domain and calculating the mean $\mu$ and the standard deviation $\sigma$ of the Gaussian curve; the frequency of the mean $\mu$ enabling calculating mean surface velocity over the zone of width L2 and the standard deviation $\sigma$ enabling calculating velocity distribution over the same zone of width L2;

calculating a ratio L2/L1 between the width L2 of the zone impacted during the measurements and the width L1 of the free surface of the fluid to determine whether one of three cases is met;

the processor being self-learning by detecting conditions under which the spectrum of discrete data obtained is recordable, and determining the mean velocity of the fluid within the open channel or the partially filled duct free of finite element or finite difference modeling, the mean velocity based on the ratio L2/L1 along with the mean $\mu$ and the standard deviation $\sigma$ of the Gaussian curve, the processor calculating the mean velocity with increased efficiency and precision using fewer calculations from the measurement of the surface velocity using the reduced pulsed zone of width L2;

wherein, in a first case, L1 is equal to L2, the mean velocity of the fluid within the open channel or partially filled duct is equal to the mean surface velocity of the fluid over the zone of width L2;

wherein, in a second case, the ratio L2/L1 is greater than or equal to ⅔ and less than 1, the mean velocity of the fluid within the open channel or partially filled duct is equal to the mean surface velocity of the fluid over the zone of width L2 multiplied by a correction factor that depends on the standard deviation a of the Gaussian curve; and wherein, in a third case, the ratio L2/L1 is less than ⅔, the mean velocity of the fluid within the open channel or partially filled duct is calculated based on the distribution of velocities measured over the zone of width L2 extrapolated for the missing velocities based on prior recordings of the velocity distribution when said ratio was greater than or equal to ⅔.

* * * * *